United States Patent [19]

Mintz

[11] 4,220,900
[45] Sep. 2, 1980

[54] MOTOR CONTROL SYSTEM FOR A LINEARLY RECIPROCATING LOAD DEVICE SUCH AS AUTOMOTIVE VEHICLE CLOSURE INCLUDING SUN ROOF

[75] Inventor: Irwin H. Mintz, St. Louis, Mo.

[73] Assignee: Sky-Top Sunroofs Ltd., St. Louis, Mo.

[21] Appl. No.: 916,206

[22] Filed: Jun. 16, 1978

[51] Int. Cl.² ............................................. H02P 3/08
[52] U.S. Cl. ................................... 318/266; 318/447;
318/450; 318/453; 318/469; 318/476
[58] Field of Search .......... 296/137 E, 137 F, 137 G;
318/255, 256, 261, 264, 266, 275, 445, 446, 447,
450, 452, 453, 466, 467, 468, 469, 474, 476,
471–473

[56] References Cited

U.S. PATENT DOCUMENTS

| | | | |
|---|---|---|---|
| 3,332,007 | 7/1967 | Livengood et al. ..................... 323/9 |
| 3,581,174 | 5/1971 | Hammer ........................... 318/466 X |
| 3,624,473 | 11/1971 | Robbins ........................... 318/466 X |
| 3,689,814 | 9/1972 | Holt ................................. 318/466 X |
| 3,845,373 | 10/1974 | Totsu .................................. 318/434 |
| 3,868,554 | 2/1975 | Konrad ........................... 318/472 X |
| 3,891,909 | 6/1975 | Newson .............................. 318/469 |
| 3,955,130 | 5/1976 | Graf .................................. 318/332 |
| 4,027,221 | 5/1977 | Newell ............................... 318/484 |
| 4,048,662 | 9/1977 | Bureuburu ............................ 361/31 |
| 4,066,942 | 1/1978 | Bardwell et al. .................... 318/434 |

Primary Examiner—J. V. Truhe
Assistant Examiner—John W. Redman
Attorney, Agent, or Firm—Hyman F. Glass; Sidney B. Ring

[57] ABSTRACT

A system is provided to control a load responsive to a maximum load condition to disable the load when the maximum load condition exists, the control being altered first to provide a period of non-response during load start up and secondly to provide temperature compensation over a very wide temperature range and more particularly where the load device is a motor means for linearly reciprocating a closure member such as a sun roof, a window or a door, particularly for a vehicle such as an automotive vehicle.

8 Claims, 2 Drawing Figures

MOTOR CONTROL SYSTEM FOR A LINEARLY RECIPROCATING LOAD DEVICE SUCH AS AUTOMOTIVE VEHICLE CLOSURE INCLUDING SUN ROOF

BACKGROUND OF THE INVENTION

In the automotive art, selectively openable sun roofs have become popular. In their development, they were originally manually operated. This was not satisfactory and motor operated means were developed for selectively driving such roof members from their closed to open position and reversely driving them from their open to closed position. While these motor driven sun roof arrangements were convenient, they had some substantial disadvantages in that they were inherently unsafe in that if any part of a person were in the roof area, the roof would close on him to his injury or if any hard object were in the area, mechanical damage could be done to either the mechanism or the vehicle structure. It was accordingly apparent that some means had to be provided to disable the drive motor when the moving roof member came in contact with an obstruction so that the force exerted by the moving roof would be limited to a safe value. Various expedients were developed. Mechanical means such as slip clutches were interposed in the drive train between the motor and the roof. While this was an improvement, the arrangement was unreliable and raised as many problems as it solved. Another approach was the use of springs which were compressed when the motor torque exceeded a given value. This principle was applied in U.S. Pat. No. 4,039,222 which is assigned to the assignee of this invention and this Application therefor. While this arrangement is a definite improvement, it was deemed desirable to eliminate the springs and the rotatably mounted motor housing of the motor and to utilize the motor in fixed position. It appeared that the most desirable approach would be to eliminate the mechanical components and substitute a purely electrical control of the drive motor. Since the current drawn by an electric motor is a measure of the torque of the motor, it would appear that a control system responsive to the current drawn by the drive motor would be a convenient measure of the motor torque and hence be a convenient limitation on the force applied to the roof and hence provide reliable protection of passengers, material and the vehicle. While this approach is theoretically sound, it was found that it was far from satisfactory and this invention was made to resolve these shortcomings as will be hereinafter discussed.

The first difficulty was that the starting current of the electric motor is far in excess of the maximum steady state current which produces the maximum torque and if the control system responded to the starting current, it would disable the motor circuit and the drive arrangement would be inoperative. The second difficulty was that electronic circuit elements have temperature coefficient characteristics which result in varying circuit response values. This is particularly true in the present Application wherein the temperature of the vehicle closure, for example, the roof closure, the window, or the door, particularly the door of a van, may vary from a high of in excess of 220° F. in the summer sun and a low of −30° F. in the winter. It is apparent that this temperature range goes far beyond the usual operating conditions for such electronic circuitry.

OBJECTS OF THE INVENTION

It is an object of the invention to provide an electronic circuit responsive to the current supplied to a load device wherein the load device is disabled when the current exceeds a predetermined value and wherein the circuit is rendered nonresponsive to the current for a predetermined period of time during initial energization of the load device.

It is a further object of the invention to provide an electronic circuit responsive to the current supplied to a load device wherein the load device is disabled when the current exceeds a predetermined value and wherein the circuit is compensated for an extremely wide range of temperature.

It is a further object of the invention to provide a control circuit for a motor driven load device which is adapted selectively to move linearly in a first direction to a limit point or in a reverse direction to a second limit point, the control circuit being provided with current responsive means which disable the motor when the motor current exceeds a predetermined value.

It is a further object of the invention to provide a control circuit for a motor driven load device which is adapted selectively to move linearly in a first direction to a limit point or in a reverse direction to a second limit point, the control circuit being provided with current responsive means which disable the motor when the motor current exceeds a predetermined value and a further means which inactivates the control circuit for a predetermined time during the starting of the motor.

It is a further object of the invention to provide a control system for a vehicle sun roof wherein the sun roof is driven selectively in both directions by a motor through a transmission and wherein the motor is provided with a control circuit which selectively controls the motor to drive the sun roof to either an open or closed position and wherein the control circuit disables the motor when the motor current exceeds a predetermined value and the control circuit includes means which inactivates the control circuit for a predetermined time during the starting of the motor.

It is a further object of the invention to provide a control system for a vehicle sun roof wherein the sun roof is driven selectively in both directions by a motor through a transmission and wherein the motor is provided with a control circuit which selectively controls the motor to drive the sun roof to either an open or closed position and wherein the control circuit disables the motor when the motor current exceeds a predetermined value and the control circuit includes means for compensating for extremely wide ranges of operating temperature.

Other objects and features of the invention will be readily apparent from the following detailed description which is not limited but only illustrative of the preferred embodiment of this invention.

DETAILED DESCRIPTION OF A PREFERRED EMBODIMENT

Figure 1:
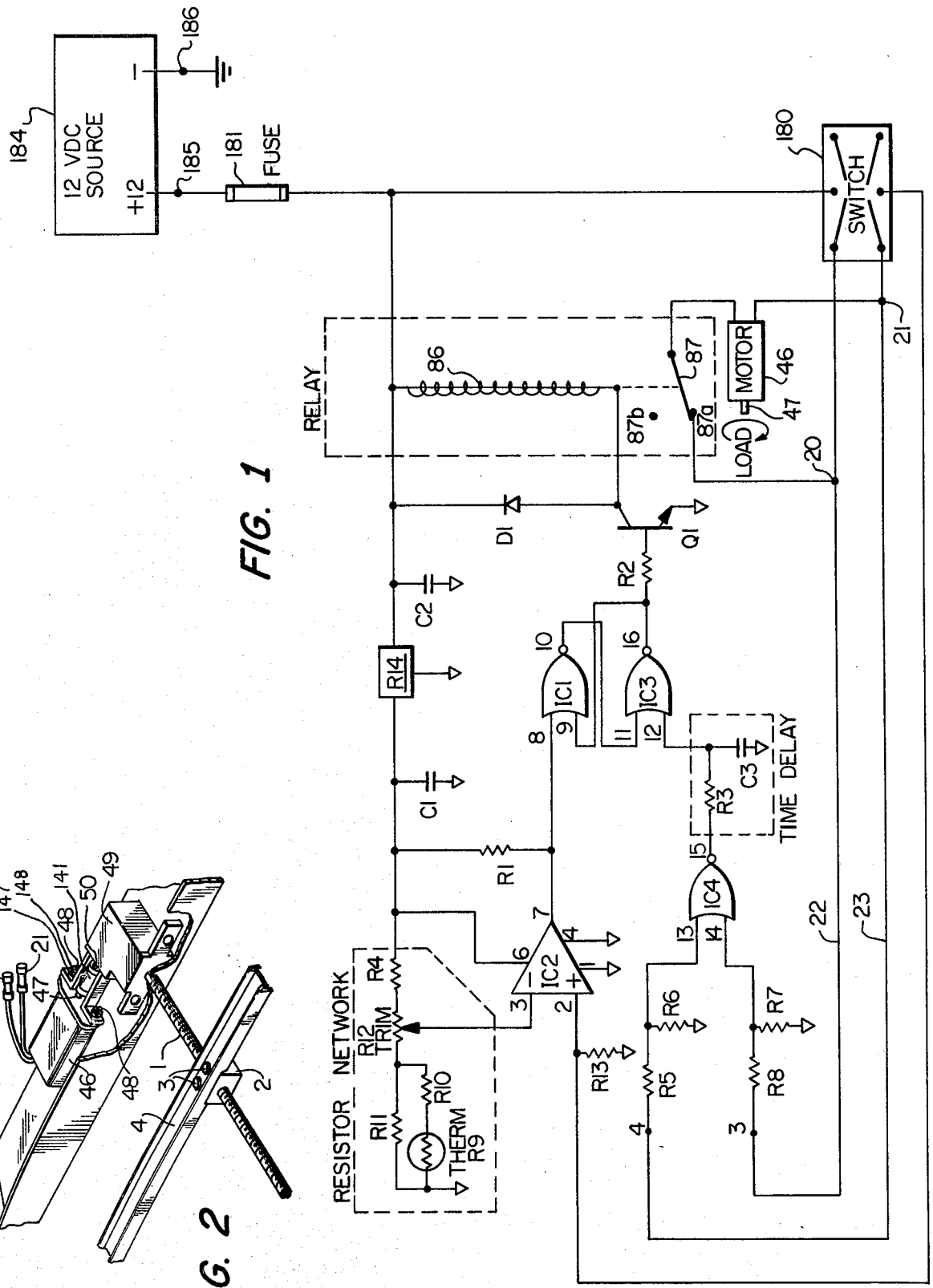
FIG. 1 is a schematic circuit diagram showing a control system in accordance with the invention.
Figure 2:
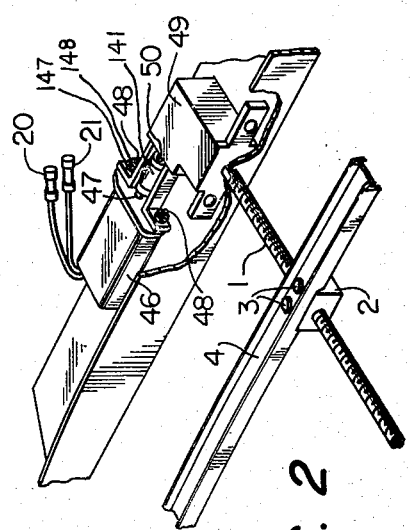
FIG. 2 is a perspective view of a portion of the arrangement for controlling the reciprocal linear movement of the sliding closure such as the sun roof disclosed in aforementioned U.S. Pat. No. 4,039,222.

Referring to FIGS. 1 and 2, electric motor 46 is selectively energized from power source 184, for example, an automobile storage battery, with terminals 185, 186 through a double pole double throw switch 180 which determines the direction in which shaft 47 of motor 46 rotates. A control system shown in FIG. 1 is interposed in the motor circuit to produce the desirable results of this invention heretofore set forth and hereinafter more fully explained. Shaft 47 of motor 46 is connected by coupling 141 to shaft 50 of transmission 49 which drives lead screw 1 which engages drive nut 2 mounted by screws 3,3 on power or shuttle bar 4 secured to a closure member (not shown herein) of the automobile sun roof disclosed in aforementioned U.S. Pat. No. 4,039,222. Considering the operation of this arrangement in the absence of the control system of FIG. 1, if switch 180 is thrown to a first position, shaft 47 of motor 46 would rotate in a first direction, lead screw 1 would rotate in a similar first direction, power bar 4 would travel linearly in a corresponding first direction. At the limit of travel, if the operator did not immediately throw switch to the neutral position, the closure would jam with resulting damage to the equipment and possible injury to any person who might be in the linear path of the closure. It is apparent that throwing switch 180 to the reverse position whould reverse the operation. Lock washers 147 and hex nuts 148 secure threaded motor studs 48 on transmission 49. Unlike the motor disclosed in the sun roof arrangement of U.S. Pat. No. 4,039,222, the motor housing of motor 46 and, of course, motor 46 are fixedly positioned or mounted as is transmission 49 with motor shaft 47 coupled to transmission shaft 50 for rotation therewith.

Referring to FIG. 1, the output of electrical power source 184, which may be an automotive storage battery, is applied through fuse 181 to one leaf of double pole double throw switch 180 and by way of ground through a low ohmage (for example 0.2 ohm) high power resistor R13 to the other leaf of switch 180. The cross connected contacts of switch 180 are connected to motor 46 so that, dependent on the position of switch 180, electrical power of selected polarity is applied to motor 46 to determine the direction of rotation of shaft 47 of motor 46. Since the current flowing in resistor R13 is the current flowing in motor 46, regardless of the direction of rotation of shaft 47 of motor 46, the voltage drop across resistor R13 is a measure of the torque produced by motor 46. A reference voltage is set up by resistor network R4, R9, R10, R11 and R12. Resistor R4 establishes the initial voltage level and the other four resistors set the desired range. Resistor R12 is a variable resistor used to vary the current limit and its setting determines the value of permissible motor current or torque at which the system operates. Thermal resistor R9 adjusts the reference for temperature compensation. Resistor R11 limits the low temperature response and resistor R10 limits the high temperature response of thermal resistor R9. The voltage applied to said resistor network is reduced to a desirable level, e.g. 5 volts, and noise pulses are filtered by the filter comprising capacitors C1 and C2 and regulator R14. The voltage output of said resistor network and the voltage drop across resistor R13 (connected to pin 2 of comparator IC2) are compared by comparator IC2 which may be a differential amplifier. Pin 4 of comparator IC2 is connected to ground. Pin 6 of comparator IC2 is cross-connected to resistor R4. Resistor R1 bypasses the resistor network to the output terminal 7 of comparator IC2.

When the voltage across resistor R13 rises above the reference voltage output of said resistor network, the output from comparator IC2 goes from a low to a high value. This triggers the latch formed by gates IC1 and IC3 and switches transistor Q1 conductive through resistor R2 and thereby energizes relay 86 to drive contact 87 from position 87a to position 87b thus opening the motor circuit. Diode D1 is provided to prevent burnout of Q1 by inductive kickback in relay 86. The latch comprising gate IC1 (pins 9 and 10) and gate IC3 (pins 11 and 16) is disabled until pin 12 goes low. When latch is enabled, pin 7 of IC2 going high will reverse latch causing pin 16 of IC3 to go high and turns on Q1 and closes relay 86 disengaging 87a. This signal is generated from comparator IC2 (pins 1 and 7). Pin 9 of gate IC1 is cross-connected to pin 16 of gate IC3. Pin 10 of IC1 is cross-connected to pin 11 of gate IC3. Each of the two motor leads is tapped at points 20, 21 to provide sensing wires 22, 23 which enter the control circuit at terminals 3,4 where each respectively is applied to resistor network R5, R6 and resistor network R7, R8. These resistor networks are voltage dividers and reduce the source voltage to a working voltage level, e.g. from =12 volts to =5 volts. The resulting outputs of these two resistor networks are transmitted to pins 13, 14 of gate IC4. Since all polarity reversal is accomplished in switch 180, gate IC4 compensates for polarity reversal occasioned by motor reversal.

Whenever switch 180 is activated, either pin 13 or pin 14 of gate IC4 will be high and the output of gate IC4 (pin 15) is low. When switch 180 is released and automatically returns to neutral position, both pins 13 and 14 are low because of pull-down resistors R6 and R7 and pin 15 goes high, thereby resetting the latch to deenergize relay 86 so that contact 87 returns to position 87a. If pin 15 of gate IC4 were connected directly with pin 12 of gate IC3, operation of the control system would be disturbed by the fact that the starting current of the electric motor is considerably in excess of the normal operating current drawn by the motor. It is therefore necessary to disable the control system during the time of motor start-up so that it would not be responsive to the excessive motor starting current since response thereto would disable the motor. This is done by interposing a delay line comprising resistor R3 and capacitor C3 between pin 15 of gate IC4 and pin 12 of gate IC3. This delays any change on pin 12 of gate IC3 for a predetermined time, e.g. 100 milliseconds, to allow the motor current to fall to a normal value. During this predetermined time, pin 12 of gate IC3 stays high and keeps the latch reset regardless of the output of comparator IC2, thereby keeping the starting current from shutting it off.

As set forth herein the present control system results in a motor control for a linearly reciprocating closure which is reliably safe in its operation to prevent injury to person, object or equipment and wherein its operation is reliably constant within an extremely wide temperature range.

While only one embodiment of the invention has been described in detail herein and shown in the accompanying drawings, it is evident that various modifications are possible in the arrangement and construction of its components without departing from the scope of the invention.

Many alterations and changes may be made without departing from the spirit and scope of this invention which is set forth in the appended claims which are to be construed as broadly as possible in view of the prior art. The scope of this invention is to be determined by the claims hereof.

I claim:

1. A control system for starting and stopping a load device having a predetermined maximum steady state value of load current and a starting current substantially in excess of said steady state load current, a load circuit power source, means for providing a reference voltage which is indicative of said maximum steady state value of load current, said means comprising a resistor network including resistor means whose voltage drop is indicative of said predetermined value of steady state current, and a circuit network comprising temperature compensating means for maintaining accuracy of said reference voltage through a wide range of temperature variation, means for limiting the temperature response at the lower limit of the temperature range and means for limiting the temperature response at the high end of the temperature range, a load resistor in series with said load device, the voltage drop in said load resistor being indicative of the current flowing in said load device, means for comparing said reference voltage and said voltage drop across said load resistor to produce a difference voltage, means responsive to said difference voltage to disable said load device when the steady state current of said load device exceeds the predetermined maximum steady state value and means for delaying the response of said difference voltage responsive means for a predetermined time so that the control system is not responsive to the starting current of said load device.

2. A control system as set forth in claim 1, wherein said delay means comprises a resistor-capacitor combination.

3. A motor control system for a motor adapted to drive a load and to be started and run in either forward or reverse direction and to be stopped at definite limits of travel of the load, a motor, means for disabling said motor when a predetermined value of torque is exceeded as measured by the motor load current, a power source for said motor, a reversing switch for controlling the energization of said motor for rotation in either forward or reverse direction, a load resistor in series with said motor so that the voltage drop across said load resistor is indicative of said motor load current and hence of the resultant motor torque, a resistor network for providing a reference voltage which is indicative of the maximum steady state motor current which corresponds to the maximum permissible motor torque, said resistor network comprising a resistor whose voltage drop corresponds to the maximum steady state motor current, and a circuit network comprising temperature compensating means for maintaining accuracy of said reference voltage through a wide range of temperature variation, means for limiting the temperature response at the lower limit of the temperature range and means for limiting the temperature response at the high end of the temperature range, comparator means for comparing said reference voltage and the voltage drop across said load resistor to produce a difference voltage, means responsive to said difference voltage to disable said motor when the steady state motor current exceeds the value corresponding to said maximum value of motor torque and means for delaying the response of said difference voltage responsive means for a predetermined time so that the control system is not responsive to the starting current of said motor.

4. A motor control system as set forth in claim 3, including means connected to both of the terminals of said motor for deriving a voltage of fixed polarity regardless of how said motor is energized for either forward or reverse operation to be applied to said comparator means.

5. A motor control system as set forth in claim 4, wherein said delaying means comprises a resistor-capacitor combination.

6. A linearly reciprocating closure control system including a closure member having a terminal open position and a terminal closed position, a transmission, drive means for said closure member comprising a motor which drives said closure member through said transmission, a control system for said motor comprising a reversing switch which energizes said motor to rotate in either a forward or a reverse direction to drive said closure member to either a terminal open or a terminal closed position, means for disabling said motor when a predetermined value of torque is exceeded as measured by the motor load current, a load resistor in series with said motor so that the voltage drop across said load resistor is indicative of said motor load current and hence of the motor torque, a resistor network for providing a reference voltage which is indicative of the maximum steady state motor current which corresponds to the maximum permissible motor torque, said resistor network comprising a resistor whose voltage drop corresponds to the maximum steady state motor current, and a circuit network comprising temperature compensating means for maintaining accuracy of said reference voltage through a wide range of temperature variation, means for limiting the temperature response at the lower limit of the temperature range and means for limiting the temperature response at the high end of the temperature range, comparator means for comparing said reference voltage and the voltage drop across said load resistor to produce a difference voltage, means responsive to said difference voltage to disable said motor when the steady state motor current exceeds the value corresponding to the maximum value of motor torque thereby to stop said closure member at the position where an obstruction comes into contact with said closure member and means for delaying the response of said difference voltage responsive means for a predetermined time so that the control system is not responsive to the starting current of said motor.

7. A linearly reciprocating closure control system as set forth in claim 6, wherein said transmission comprises gearing driving a screw member which engages a drive nut which is secured to said closure member.

8. A linearly reciprocating closure control system as set forth in claim 7, wherein said closure member is a sun roof for an automobile.

* * * * *